United States Patent [19]

Saltykov et al.

[11] 3,990,127
[45] Nov. 9, 1976

[54] APPARATUS FOR STRIPPING HIDES FROM ANIMALS

[76] Inventors: Alexandr Nikolaevich Saltykov, proezd Dezhneva, 26, korpus 2, kv. 82; Vasily Matveevich Gorbatov, prospekt Mira, 74, kv. 70; Jury Alexandrovich Saltykov, Yasny proezd, 12, korpus 2, kv. 174; Oleg Alexandrovich Saltykov, proezd Dezhneva, 26, korpus 2, kv. 82, all of, Moscow, U.S.S.R.

[22] Filed: Apr. 11, 1975

[21] Appl. No.: 567,174

[30] Foreign Application Priority Data
Apr. 17, 1974  U.S.S.R. ............................ 2012229

[52] U.S. Cl. ................................. 17/21; 17/44.2
[51] Int. Cl.² ................................................ A22B 5/16
[58] Field of Search ............ 17/21, 50, 24, 17, 44.2, 17/44.3, 44, 1 R; 192/93 R, 93 A, 93 C; 248/320, 321, 322; 294/86.19, 86.2, 86.21

[56] References Cited
UNITED STATES PATENTS
3,423,789   1/1969   Ochylski .............................. 17/21
FOREIGN PATENTS OR APPLICATIONS
271,325   2/1968   U.S.S.R. .............................. 17/21
195,348   6/1967   U.S.S.R. .............................. 17/21
142,904   3/1962   U.S.S.R. .............................. 17/21
249,961   4/1971   U.S.S.R. ............................ 17/44.2

OTHER PUBLICATIONS

The National Provisioner, "Russian Meat Industry: Aims High, Makes Progress", vol. 146, Issue 11, pp. 14–18, Mar. 17, 1962.

*Primary Examiner*—Louis G. Mancene
*Assistant Examiner*—James D. Hamilton
*Attorney, Agent, or Firm*—Haseltine, Lake & Waters

[57] ABSTRACT

The apparatus of the present invention comprises parallel overhead tracks carrying anchoring members for suspending an animal carcass by the hind legs, and inside and outside conveyers travelling in curvilinear guides at different speeds and serving, respectively, for anchoring the fore legs of the carcass and for gripping the hide, one conveyer being arranged within the boundaries of the other.

The apparatus incorporates devices serving to detach hooks from rods, the opposite ends of the rods mounting one said device each, with said devices adapted for detachment of the hooks according to the size of the carcass.

4 Claims, 5 Drawing Figures

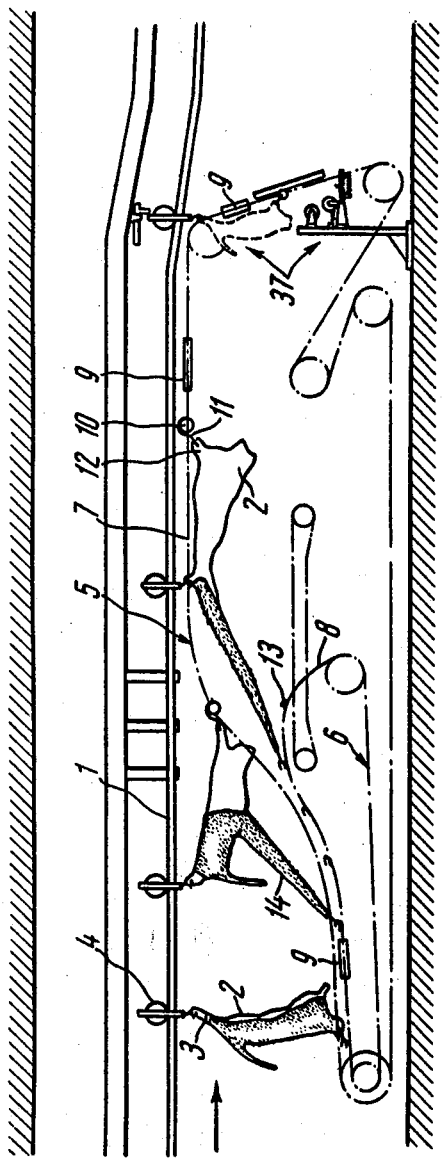
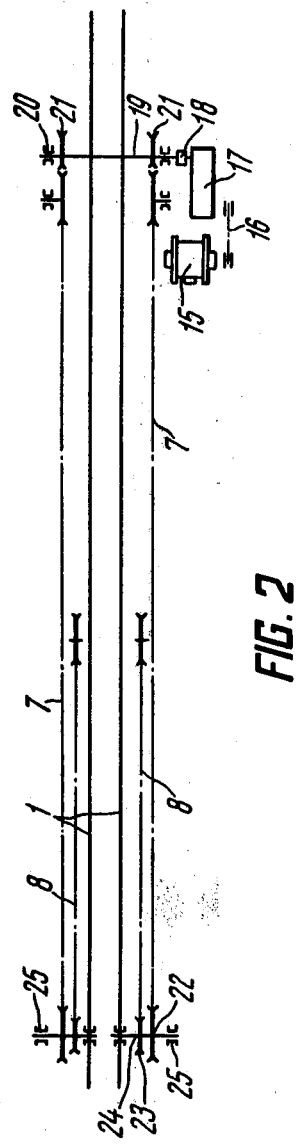
FIG.1
FIG.2

APPARATUS FOR STRIPPING HIDES FROM ANIMALS

BACKGROUND OF THE INVENTION

The present invention relates to equipment used in meat industry, and, more particularly, to an apparatus for stripping hides from animals.

Known in the art is an apparatus for stripping hides from animals, comprising overhead tracks used for suspension of carcasses by hind legs by means of anchoring members made in the form of rollers or hooks. The apparatus comprises two closed-loop chain conveyers travelling over curvilinear guides in the same direction at different speeds.

Chains of the outside conveyer receive transverse rods serving for anchoring the fore legs of the carcass by means of the hooks.

The inside conveyer is adapted for gripping of the hide being stripped.

The apparatus incorporates devices adapted to detach the hooks from the rods, the opposite ends of the rods mounting one said device each.

Each prior art apparatus includes a tube with recesses, seated on the rod throughout its length, the recesses being adapted to accommodate the hooks and are provided with bosses which detach the hooks from the rod.

One end of the tube mounts a sprocket mating with a chain section fastened to the inclined portion of the outside conveyer guide. The sprocket engages the chain at the instant when the rod approaches said portion of the conveyor guide.

When the rod holding the fore legs of the carcass anchored in the recesses of the tube by means of the hooks, approaches said portion, the sprocket mates with the chain section fastened to the inclined portion of the outside conveyer guide. When the tube turns, the bosses thrust against the end face of each hook serving to anchor the fore legs of the carcass, whereby the hooks are detached from the rod.

At the instant when the hooks are detached from the rod, the hind legs of the carcass are not anchored, so they travel freely over the inclined tracks.

The hooks are detached from the rods in the prior-art apparatus only when a certain point is reached, irrespective of the size of the carcass. The sprocket located at the end of the tube mates with the chain section disposed on the conveyer guide in a definite place, hence, the fore legs of the carcass, no matter large or small, are always separated from the rod at the instant when the latter approaches the beginning of the chain section. Consequently, the carcass starts swinging. If the carcass is medium- or large-size, the belly of the carcass rubs against the rod while swinging and becomes dirty.

It is an object of the present invention to provide an apparatus for stripping hides from animals, which permits detachment of the hooks anchoring the fore legs of the carcass, depending on the size of the carcass, and, thereby, prevents fouling of the belly of the carcass.

SUMMARY OF THE INVENTION

With this object in view, proposed herein is an apparatus for stripping hides from animals comprising parallel overhead tracks mounting anchoring members for suspending an animal carcass by the hind legs, closed-loop conveyers, one of these located within the boundaries of the other, the conveyors travelling in curvilinear guides at different speeds, the outside conveyer incorporating rods, whereto the fore legs of the carcass are anchored by means of hooks, while the inside conveyer is adapted for gripping the hide being stripped, and devices serving to detach the hooks from the rods, the opposite ends of each rod mounting one said device, wherein, according to the invention, each device for detachment of the hooks from the rods includes two taper disks mounted on the rod at a certain clearance to accommodate the hook, one of the disks being spring-loaded and adapted to move axially along the rod and geared during displacement with a gear rack seated on the guide at the end of the working section of the outside conveyor.

In the apparatus of this invention, the device for detachment of the hooks from the rods provides for separation of the hooks from the rods depending on the size of the carcass. This prevents rubbing of the belly of the medium- or large-size carcass against the rod after the hooks are detached, and also prevents fouling.

According to the invention, in the device for detachment of the hooks from the rods the gearing established between the axially movable disk and the gear rack is effected through a clutch which carries a gear meshing with said gear rack.

It is expedient that the gearing be effected by means of said clutch carrying said gear, the gear meshing with said gear rack, which renders said kind of coupling simple and reliable in service.

According to the invention, provided in the apparatus and disposed above the overhead tracks at the end of the working section of the outside transporter is a device for holding the carcass at the instant when the hooks are detached from the rods, said device comprising a knee lever with the pivot axis thereof arranged on a bracket disposed within the limits of the outside conveyer, and two double-arm levers seated on a common shaft, the ends of the levers carrying stops for interaction with the anchoring members of the overhead tracks, whereas the opposite ends of the lever are geared through a cable and pully linkage to one end of the knee lever, the other end thereof serving for interaction with the rod after the hooks are detached therefrom.

Inasmuch as the device for holding the carcass is located above the inclined section of the overhead tracks at the end of the working section of the outside conveyer, it is possible to stop the carcass in the area most suitable for detachment of the hooks depending on the size of the carcass, and the constructional features of the device provide for automatic displacement of the carcass from the apparatus over the overhead tracks after the hooks are separated from the rods.

According to the invention, in the device for holding the carcass at the instant when the hooks are detached from the rods the end of the knee lever interacting with the rod is made of two portions interconnected by a link, the outer portion being spring-loaded and adapted to turn if reverse travel of the rod occurs.

Since the knee lever end interacting with the rod is composed of two portions, the rod is capable of free travel in the opposite direction in case of forced reverse travel of the outside conveyer.

BRIEF DESCRIPTION OF THE DRAWING

The invention will now be described in detail with reference to a preferred embodiment thereof taken in conjunction with the accompanying drawings, wherein:

FIG. 1 presents schematically a general side view of an apparatus for stripping hides from animals, according to the invention, with a cutaway view of the guides;

FIG. 2 is a plan view of the same apparatus, according to the invention;

DESCRIPTION OF THE PREFERRED EMBODIMENT

Figure 3:
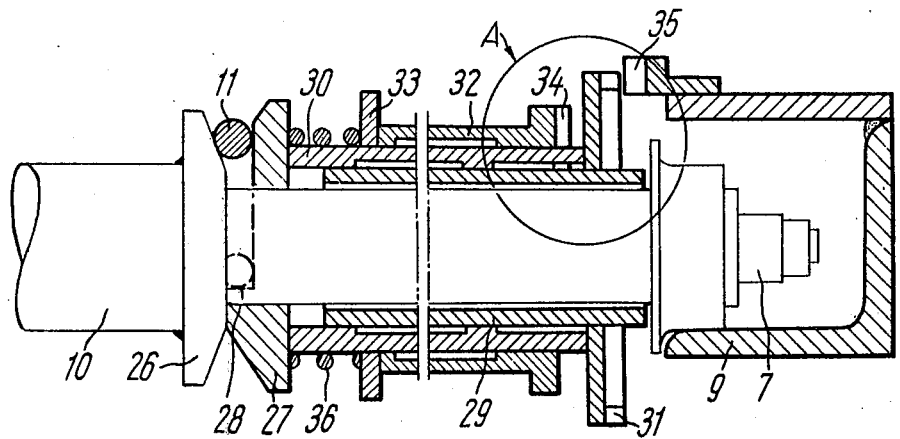
FIG. 3 is a side section view of a device for detachment of hooks used for anchoring the fore legs of the carcass, according to the invention.

Referring to FIG. 1, the apparatus for stripping hides from animals comprises two parallel overhead tracks 1 serving to suspend a carcass 2 by hind legs 3 by means of anchoring members 4, said tracks 1 including horizontal and inclined sections.

Said anchoring members 4 can be made in the form of rollers or hooks. Installed in the apparatus under the overhead tracks 1 are an outside conveyer 5 and an inside conveyer 6, one of these arranged within the limits of the other. Chains 7 and 8 of each said outside conveyer 5 and inside conveyer 6, respectively, are parallel and are adapted to travel in curvilinear guides 9 in the same direction at different speeds. The parallel chains 7 of the outside conveyer 5 are interconnected by transverse rods 10 whereto the carcass 2 is anchored by fore legs 12 by means of hooks 11. The outside conveyer 5 is intended for anchoring the fore legs 12 of the carcass 2. The chains 8 of the inside conveyer 6 mount hooks 13 for gripping the ends of a hide 14. The inside conveyer 8 is used for gripping the hide 14.

The outside conveyer 5 whereto the fore legs 12 of the carcass 2 are anchored, is actuated by an electric motor 15 (FIG. 2) through a drive comprising a V-belt transmission 16 linked with a reduction gear 17 coupled through a clutch 18 to a drive shaft 19 mounted in bearings 20, and chain sprockets 21 seated on the shaft 19 and mating with chain 7 which also runs around a sprocket 22.

Each chain 8 of the conveyer 6 used for gripping the hide 14, is actuated by the respective chain 7 of the conveyer 5 used for anchoring the fore legs 12 of the carcass 2 by a sprocket 22 of the chain 7 of the conveyer 5 and by a sprocket 23 of the chain 8 of the conveyer 6, said sprockets being attached to a shaft 24 mounted in bearings 25. The conveyer 5 serving for anchoring the fore legs 12 of the carcass 2 is travelling faster than the conveyer 6 serving to hold the hide 14, because the diameters of the sprockets 22 and 23 are different.

Each chain 7 and 8 (FIG. 1) of the respective conveyers 5 and 6 travel in the curvilinear guides 9 divided into sections, where the hide is stripped laterally with respect to the carcass 2 at one section, and longitudinally at the other, when said hide and the carcass 2 are displaced by the conveyers 5 and 6.

Figure 4:
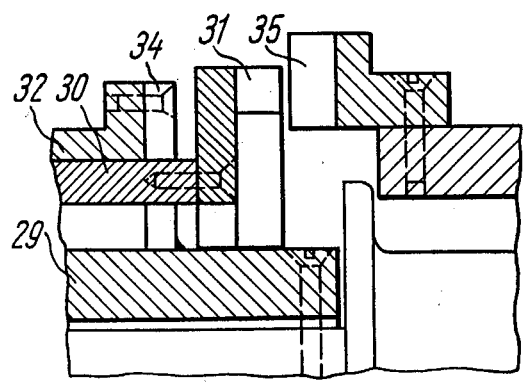
FIG. 4 shows the detail A of FIG. 3.

The apparatus incorporates devices seated on the opposite ends of each rod and used for detachment of the hooks 11 from the rods 10. Each device comprises two taper disks 26 and 27 (FIGS. 3 and 4) fitted on the rod 10 at a certain clearance to install the hook 11 intended to anchor the fore leg 12 to the rod 10.

One disk 26 is rigidly attached to the rod 10, and the other disk 27 is axially movable along the rod 10 and is provided with a stop 28 for detachment of the hook 11.

Fitted on the rod 10 is a sleeve 29 carrying a clutch 30, one end thereof being coupled with the axially movable disk 27. The other end of the clutch 30 is made in the form of two circumferentially opposite bosses, whereto a gear 31 is attached. Fitted on the clutch 30 is an insert 32, one end thereof being provided with a continuous flange 33, and the other end being made in the form of a shaped flange 34, whereby the insert is secured to the sleeve 29.

A gear rack 35 installed on the inclined guide 9 of the outside conveyer 5 at the end of the working section thereof is mating with the gear 31 at the instant when the hook 11 is detached from the rod 10.

A helical spring 36 fitted on the clutch 30 between the axially movable disk 27 and the continuous flange 33 is used to disengage the gear 31 from the rack 35 after the hook 11 is detached from the rod 10.

The device incorporated in the apparatus of this invention and used for detachment of the hooks 11 from the rods 10 permits detachment of the rods 11 depending on the size of the carcass. This prevents rubbing of the belly of the carcass 2 of medium and large size against the rod 10, and thereby prevents fouling of the carcass.

Figure 5:
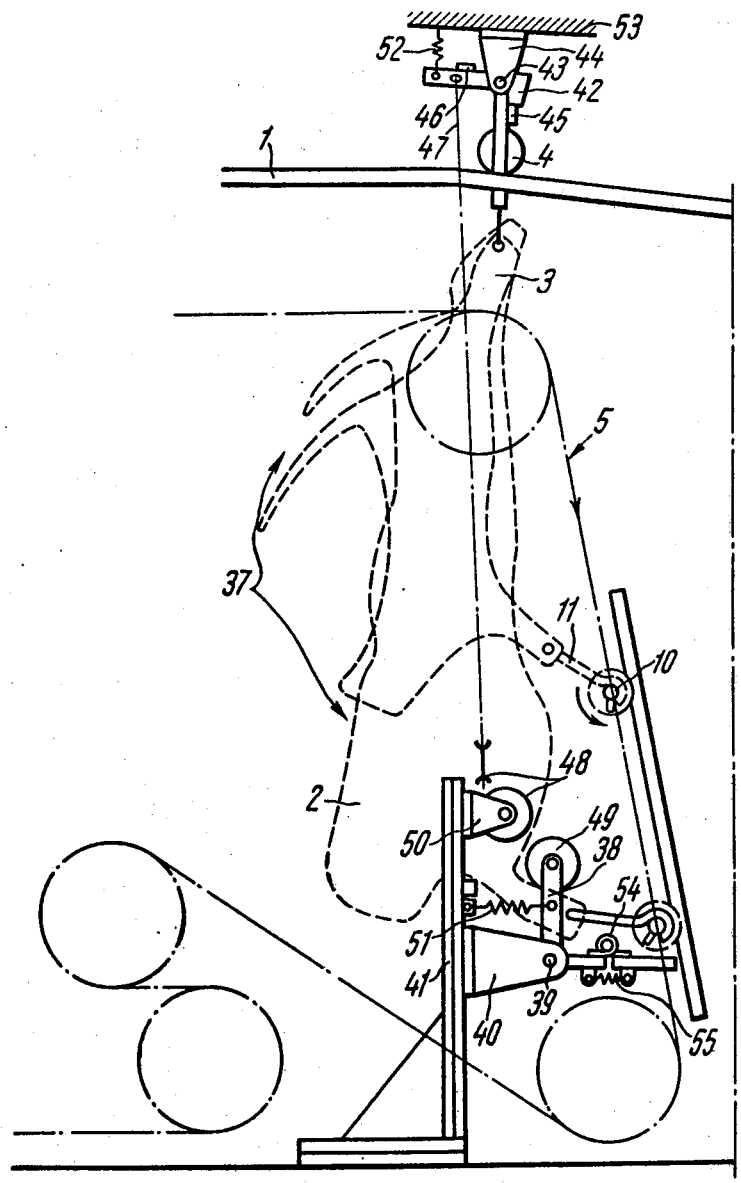
FIG. 5 shows schematically a general side view of a device for holding the carcass at the instant when the hooks are detached from the rods, according to the invention.

At the end of the working section of the outside conveyer 5 a device 37 (FIGS. 1 and 5) is installed for holding the carcass 2 at the instant when the hooks 11 are detached from the rods 10. The device includes a knee lever 38, with the pivot axis 39 thereof located on an external bracket 40 attached to a post 41 disposed outside the path of the rod 10. Said bracket 40 is arranged within the limits of the outside conveyer 5. Provided in the device for holding the carcass and arranged above the inclined sections of the overhead two double-arm levers 42 seated on a common shaft 43 and attached to a bracket 44. The ends of the double-arm levers 42 receive stops 45 interacting with the anchoring members 4 which serve to suspend the carcass from the overhead tracks 1 by the hind legs 3. The other ends of the double-arm levers 42 are rigidly interconnected by a plate 46 and are geared through a cable 47 and pulley 48 and 49 with one end of the knee lever 38, the other end thereof interacting with the rod 10 after the hooks 11 are detached.

The pulley 48 is attached to an external bracket 50 secured to the post 41, and the pulley 49 is mounted on the end of the knee lever 38 loaded by a spring 51.

The ends of the double-arm levrs 42 connected by the cable 47 to the knee lever 38 are loaded with a spring 52 which clamps them against a supporting beam 53.

The end of the knee lever 38 interacting with the rod 10 consists of two portions interconnected by a link 54, the outer portion being retained in the horizontal position by a spring 55 and adapted to turn in case of a reverse travel of the rod 10.

Since the device for holding the carcass is disposed above the overhead tracks at the end of the working section of the outside conveyer 5, it is possible to stop the carcass 2 in a position most suitable for detachment of the hooks 11 according to the size of the carcass 2, whereas the constructional features of the device provide for automatic displacement of the carcass 2 from the apparatus over the inclined sections of the overhead tracks after the hooks 11 are detached from the rod 10.

The apparatus operates as follows.

The carcass 2 suspended vertically from the overhead tracks 1 by the hind legs 3 by means of the anchoring members 4 is positioned with the belly going first.

When the carcass 2 is delivered to the conveyer 5 for anchoring the fore legs 12, the latter are fastened to the rod 10 of the conveyer 5. The hide 14 is fixed to the hooks 13 located on the chains 8 of the conveyer 6 by the portions of the hide 14, separated therefrom in the area of the fore legs 12 of the carcass 2 during undercutting.

After the electric motor 15 is started, the torque is transmitted through the V-belt transmission 16, the reduction gear 17, the coupling 18, the drive shaft 19 mounted in bearings 20 and chain sprockets 21 seated on said shaft to the chains 7 of the conveyer 5 whereto the fore legs 12 of the carcass 2 are anchored. In its turn, each chain 7 of the conveyer 5 imparts motion through the sprockets 22 and 23 attached to the shaft 24 mounted in the bearings 25, to the respective chain 8 of the conveyer 6 whereto the hide is secured.

Since the diameters of the sprockets 22 and 23 are different, the conveyer 6 serving for gripping the hide moves slower than the conveyer 5 serving for anchoring the fore legs 12 of the carcass 2.

When the conveyers 5 and 6 are running, the carcass 2 anchored thereto by the fore legs, held by the hide 14 and suspended by the hind legs 3 vertically from the overhead tracks 1 is set to motion and starts pulling up the anchoring members 4 located above the overhead tracks and used to suspend the carcass 2 by the hind legs 3.

During displacement, the hide 14 is separated from the hide 14.

After the hide 14 is stripped off, the carcass 2 suspended by the hind legs 3 from the overhead tracks 1 by means of the anchoring members 4 approaches the carcass holding device 37. The anchoring members 4 restricted by the stops 45 interrupt displacement of the hind legs 3 of the carcass 2 over the inclined overhead tracks. As the anchoring members 4 are restricted by the stops 45, the carcass 2 is placed to a position where the rod 10 does not contact the carcass 2, hence, no fouling of the carcass takes place.

When the hind legs 3 of the carcass 2 are retained in position, the fore legs 12 of the carcass 2 anchored to the rod 10 by means of the hooks 11 fitted into the clearances between the disks 26 and 27 are displaced by the outside conveyer 5, and the carcass 2 is stretched up.

During motion of the rod 10 and stretching of the carcass 2, each hook 11 anchoring the fore legs 12 to the rod 10 travels over the taper surfaces of the disks 26 and 27.

The disk 27 seated on the clutch 30 and adapted to move axially along the rod 10, slides along the rod, compresses the spring 36 and shifts the clutch 30 with the gear 31 attached thereto. The gear 31 meshes with the gear rack 35 disposed on the inclined guide 9 of the outside conveyer 5. The gear 31 turns together with the clutch 30 and taper disk 27 seated on the sleeve 29 and rigidly coupled with the gear 31, and the stop 28 of the disk thrusts against the end of the hook 11 which is thereby detached from the rod 10.

After the hook 11 is detached from the rod 10, the compressed spring 36 is released and the gear is thus pulled out of mesh from the gear rack 35, with the result that the disk 27 is returned to the initial position.

During further travel, the rod 10 thrusts against the two-portion end of the knee lever 38. The knee lever 38 turns about the pivot axis 39, deflects the pulley 49 seated on the opposite end of the knee lever 38, and stretches the cable 47. Under the action of the latter the ends of the double-arm levers 42 attached thereto deflect, stretching the spring 52 and turning the levers 42 about the shaft 43 thereof.

The opposite ends of the levers 42 mounting the stops 45 turn upward and release the anchoring members 4 which carry the hind legs 3 of the carcass 2. Consequently, the carcass 2 is withdrawn from the apparatus.

After the anchoring members 4 are moved further and the rod 10 stops acting on the knee lever 38, the springs 51 and 52 return the knee lever 38 and the pair of the double-arm levers 42, respectively, to the initial positions.

During operation cases are possible when malfunction of the overhead tracks 1 or anchoring members 4, or other troubles cause derailing of the anchoring members 4. Under such conditions it is necessary to loosen the carcass 2 and hide 14, and to reset the carcass 2 to the proper position.

For this purpose, the conveyer 5 is reversed. The rod 10 travelling past the two-portion end of the knee lever 38 turns the other end thereof and stretches the spring 55. After the rod 10 passes by, the spring 55 resets the outer end of the knee lever to the initial position, the carcass 2 and hide 14 are loosened, and the carcass 2 suspended from the overhead tracks 1 can be returned to the appropriate position.

The device for detachment of the hooks 11 from the rods 10, provided in the apparatus of this invention, permits detachment of the hooks 11 depending on the size of the carcass 2. This prevents the contact between the belly of a medium- or large-size carcass and the rod 10 after detachment of the hooks 11, and precludes possible fouling thereof.

Positioning of the device for holding the carcass above the overhead tracks at the end of the working section of the conveyer permits stopping the carcass in a position most suitable for detachment of the hooks, whereas the constructional features of said device provide for automatic withdrawal of the carcass from the apparatus over the inclined section of the overhead tracks after the hooks are separated from the rods.

What is claimed is:

1. An apparatus for stripping hides from animals, comprising: parallel overhead tracks for suspending an animal carcass therefrom; anchoring members, whereby said suspended carcass is anchored by the hind legs from said overhead tracks; an outside closed-loop conveyer disposed under said overhead tracks; rods located on said outside conveyer; hooks for anchoring the fore legs of said carcass to said rods; an inside closed-loop conveyer arranged within the boundaries of the outside conveyer and adapted for gripping said hide being stripped; a means for driving said outside and inside conveyers; curvilinear guides in which said conveyers travel at different speeds; a device for detachment of said hooks from said rods, the opposite ends of said rods carrying one said device each, each device for detachment of said hooks from said rods, incorporating two taper disks arranged on said rod with a certain clearance for accommodating the hook, one of said disks being axially movable along said rod; a spring, one end of which thrusts against the disk adapted to move axially; a gear rack installed on said guide at the end of the working section of the outside conveyer, said axially movable disk geared to said gear rack to effect detachment of said hook from said rod.

2. An apparatus as claimed in claim 1, wherein gearing between said axially movable disk and said gear rack is established through a clutch, mounting a gear meshing with said gear rack.

3. An apparatus for stripping hides from animals, comprising: parallel overhead tracks for suspending an animal carcass therefrom; anchoring members, whereby said suspended carcass is anchored by the hind legs from said overhead tracks; an outside closed-loop conveyor disposed under said overhead tracks, rods located on said outside conveyor; hooks for anchoring the fore legs of said carcass to said rods; an inside closed-loop conveyor arranged within the boundaries of the outside conveyor and adapted for gripping said hide being stripped; a means for driving said outside and inside conveyors; curvilinear guides in which said conveyors travel at different speeds; a device for detachment of said hooks from said rods, the opposite ends of said rods carrying one said device each, each device for detachment of said hooks from said rods, incorporating two taper disks arranged on said rod with a certain clearance for accommodating the hook, one of said disks being axially movable along said rod; a spring, one end of which thrusts against the disk adapted to move axially; a gear rack installed on said guide at the end of the working section of the outside conveyor, said axially movable disk geared to said gear rack to effect detachment of said hook from said rod; a device for holding the carcass at the instant when said hooks are detached from said rods and located above said overhead tracks at the end of the working section of the conveyor, said device comprising a knee lever with the pivot axis thereof located on a bracket arranged within the limits of said outside conveyor, and a pair of double-arm levers seated on a common shaft, one ends of said levers carrying stops interacting with said anchoring members of said overhead tracks, the other ends of the levers being geared through a cable and pulley linkage to one end of said knee lever, the other end thereof interacting with said rod after said hooks are detached therefrom.

4. An apparatus as claimed in claim 3, wherein said knee lever end interacting with said rod comprises two portions interconnected by a link, the outer portion of said end being adapted to turn in case of reverse travel of said rod.

* * * * *